US008559429B2

(12) United States Patent
Chao

(10) Patent No.: US 8,559,429 B2
(45) Date of Patent: Oct. 15, 2013

(54) SEQUENTIAL FRAME FORWARDING

(75) Inventor: Tienwei Chao, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 828 days.

(21) Appl. No.: 12/664,060

(22) PCT Filed: Jun. 11, 2008

(86) PCT No.: PCT/US2008/066468
§ 371 (c)(1),
(2), (4) Date: Dec. 11, 2009

(87) PCT Pub. No.: WO2008/154556
PCT Pub. Date: Dec. 18, 2008

(65) Prior Publication Data
US 2010/0183011 A1    Jul. 22, 2010

Related U.S. Application Data

(60) Provisional application No. 60/943,290, filed on Jun. 11, 2007.

(51) Int. Cl.
*H04L 12/28* (2006.01)
(52) U.S. Cl.
USPC ............................. 370/392; 370/465; 370/474
(58) Field of Classification Search
None
See application file for complete search history.

(56) References Cited

U.S. PATENT DOCUMENTS

| | | | |
|---|---|---|---|
| 6,377,998 B2 | 4/2002 | Noll et al. | |
| 6,553,030 B2 | 4/2003 | Ku et al. | |
| 6,697,368 B2 | 2/2004 | Chang et al. | |
| 6,735,198 B1 | 5/2004 | Edsall et al. | |
| 7,194,550 B1 | 3/2007 | Chamdani et al. | |
| 7,266,598 B2 | 9/2007 | Rolia et al. | |
| 7,821,925 B2 | 10/2010 | Davies | |
| 7,978,690 B2 * | 7/2011 | Abel et al. | 370/360 |
| 8,160,082 B2 * | 4/2012 | Harris et al. | 370/401 |
| 2003/0074467 A1 | 4/2003 | Oblak et al. | |
| 2004/0098499 A1 | 5/2004 | Tamai | |
| 2005/0111455 A1 | 5/2005 | Nozue et al. | |
| 2005/0182815 A1 * | 8/2005 | Offredo et al. | 709/200 |
| 2006/0080446 A1 | 4/2006 | Bahl | |
| 2006/0095960 A1 | 5/2006 | Arregoces et al. | |

OTHER PUBLICATIONS

FULCRUM Microsystems, Load Distribution in Telecom Servers Using FocalPoint Reduces System Cost and Improves System Flexibility, Jul. 2008, 7 pages.

(Continued)

*Primary Examiner* — Hassan Phillips
*Assistant Examiner* — Mark A Mais

(57) ABSTRACT

A data center includes a switch device, an initiating system, and first and second computing systems. A frame is received at an ingress port of the switch device from the initiating system. The frame requires processing sequentially by the first and second computing systems. Identified, in response to information carried in the frame, is a first egress port through which to forward the frame to the first computer system. The frame is received in return from the first computing system after the first computing system completes processing the frame. In response to information carried in the frame received from the first computing system, a second egress port is identified through which to forward the frame to the second computer system. The frame is forwarded to the second computer system through the second egress port for processing by the second computing system before the frame is returned to the initiating system.

34 Claims, 6 Drawing Sheets

(56) References Cited

OTHER PUBLICATIONS

James Radley, Load Balancing Between Server Blades Within Atca Platforms, Oct. 2007, 4 pages.

Cisco Systems, Inc., Cisco Data Center Infrastructure 2.5 Design Guide, Dec. 6, 2007, 180 pages.

Non-Final Office Action in related U.S. Appl. No. 12/741,225, mailed May 3, 2012; 14 pages.

International Search Report and Written Opinion for PCT/US2008/066468 dated Sep. 16, 2008; 5 pages.

Final Office Action in related U.S. Appl. No. 12/741,225, mailed on Oct. 29, 2012; 14 pages.

Non-Final Office Action in related U.S. Appl. No. 12/902,703, mailed Aug. 30, 2012; 15 pages.

Cisco Systems, The Global Server Load Balancing Primer, White Paper by Cisco Systems, 2004, 20 pages.

Final Office Action in related U.S. Appl. No. 12/902,703, mailed on Jan. 22, 2013; 15 pages.

\* cited by examiner

SEQUENTIAL FRAME FORWARDING

RELATED APPLICATION

This utility application claims the benefit of U.S. Provisional Patent Application No. 60/943,290, filed on Jun. 11, 2007, the entirety of which is incorporated by reference herein.

FIELD OF THE INVENTION

The invention relates generally to data centers. More particularly, the invention relates to techniques for reducing traffic among computing systems in a data center.

BACKGROUND

Most organizations have a data center for running those applications that handle the core business and operational data of the organization. Also referred to a server room, computer closet, or network operations center, a data center has various computing resources that support the basic intranet and Internet services needed by users within the organization, such as email servers, proxy servers, and DNS servers. In addition, data centers typically deploy network security components, such as firewalls, VPN (virtual private network) gateways, and intrusion detection systems.

In traditional networking, routers and switch devices usually refer to a MAC (Media Access Control) address, to a VLAN (Virtual Local Area Network) identifier, or to zoning information within a given frame to forward that frame. This forwarding behavior limits addressing to one other system (i.e. the next hop in the path toward the frame's destination). In a data center environment, such frame forwarding behavior can impact performance.

FIG. 1 illustrates frame forwarding behavior in a conventional data center environment 10 having a switch device 12 connected through a first port 14-1 to a first computing system 16 (here, called an initiating system), through a second port 14-2 to a second computing system 18, and through a third port 14-N to a third computing system 20. Consider that the initiating system has a frame that is to be processed by the second and third computing systems. The initiating system 16 sends (step 1) a frame to the switch device 12 over link 22. The switch device 12 forwards (step 2) the frame through the second port 14-2 to the second computing system 18 over link 24. After the second computing system completes its processing of the frame, the frame returns (step 3) to the switch device 12 through the second port 14-2 over link 24. The switch device 12 then returns (step 4) the frame to the initiating system 16 through the first port 14-1 over link 22.

On receiving the frame from the switch device 12, the initiating system 16 sends (step 5) the frame back to the switch device 12 over link 22, this time for processing by the third computing system 20. The switch device 12 forwards (step 6) the frame to the third computing system 20 through the third port 14-N over link 26. The third computing system 20 completes its processing of the frame and returns (step 7) the frame to the switch device 12 over link 26. The switch device 12 then returns (step 8) the frame to the initiating system 16 over link 22.

A disadvantage of such frame forwarding is the amount of frame traffic traversing the link 22 between the initiating system 16 and the switch device 12. In this simple illustration, this link 22 handles twice the traffic load of that handled by each of the other links 24, 26 to the other computing systems 18, 20. This traffic load multiplies with each additional computing system involved the frame processing sequence. Accordingly, for many types of data center transactions, the link can become a bottleneck on performance.

SUMMARY

In one aspect, the invention features a method of sequentially processing a frame in a data center. A frame originating from an initiating system is received at an ingress port and requires sequential processing by a first computing system and the second computing system of the data center. A first egress port is identified, in response to information carried in the frame, through which to forward the frame to the first computer system for processing. The frame is received in return from the first computing system after the first computing system completes processing of the frame. A second egress port is identified, in response to information carried in the frame received in return from the first computing system, through which to forward the frame to the second computer system. The frame is forwarded to the second computer system through the second egress port for processing by the second computing system before the frame is returned to the initiating system.

In another aspect, the invention features a data center comprising an initiating system, first and second computing systems, and a switch device physically linked to the initiating system through an ingress port, to the first computing system through a first egress port, and to the second computing system through a second egress port. The switch device is adapted to (a) receive at the ingress port a frame requiring processing sequentially by the first computing system and the second computing system, (b) identify, in response to information carried in the frame, the first egress port through which to forward the frame to the first computing system, (c) receive the frame in return from the first computing system after the first computing system completes processing of the frame, (d) identify, in response to information carried in the frame received in return from the first computing system, the second egress port through which to forward the frame to the second computing system, and (e) forward the frame through the second egress port to the second computing system for processing by the second computing system before the frame is returned to the initiating system.

In still another aspect, the invention features a switch device comprising a plurality of ports including an ingress port physically lined to an initiating system, a first egress port physically linked to a first computing system, and a second egress port physically linked to a second computing system. A frame processor receives at the ingress port a frame originating from the initiating system and requiring processing sequentially by the first computing system and the second computing system. The frame processor includes logic for identifying, in response to information carried in the frame, the first egress port through which to forward the frame to the first computing system. A frame forwarder forwards the frame through the first egress port to the first computing system for processing by the first computing system. The frame processor includes logic for receiving the frame in return from the first computing system after the first computing system completes processing of the frame and for identifying, in response to information carried in the frame received in return from the first computing system, the second egress port through which to forward the frame to the second computing system. The frame forwarder forwards the frame through the second egress port to the second computing system for processing by the second computing system before the frame is returned to the initiating system.

BRIEF DESCRIPTION OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION

Data centers embodying the present invention include a switch device or system that handles the frame forwarding sequence for frames requiring processing by multiple computing systems in the data center. By having the switch device manage the frame forwarding sequence, instead of the initiating system that sends the original frame, the sequential frame forwarding process avoids having to return the frame to its initiating system after each computing system completes in turn its processing of the frame. By not returning the frame to the initiating system after each computing system performs its function, the sequential frame forwarding process advantageously reduces the traffic on the link between the initiating system and the switch device.

Figure 1:
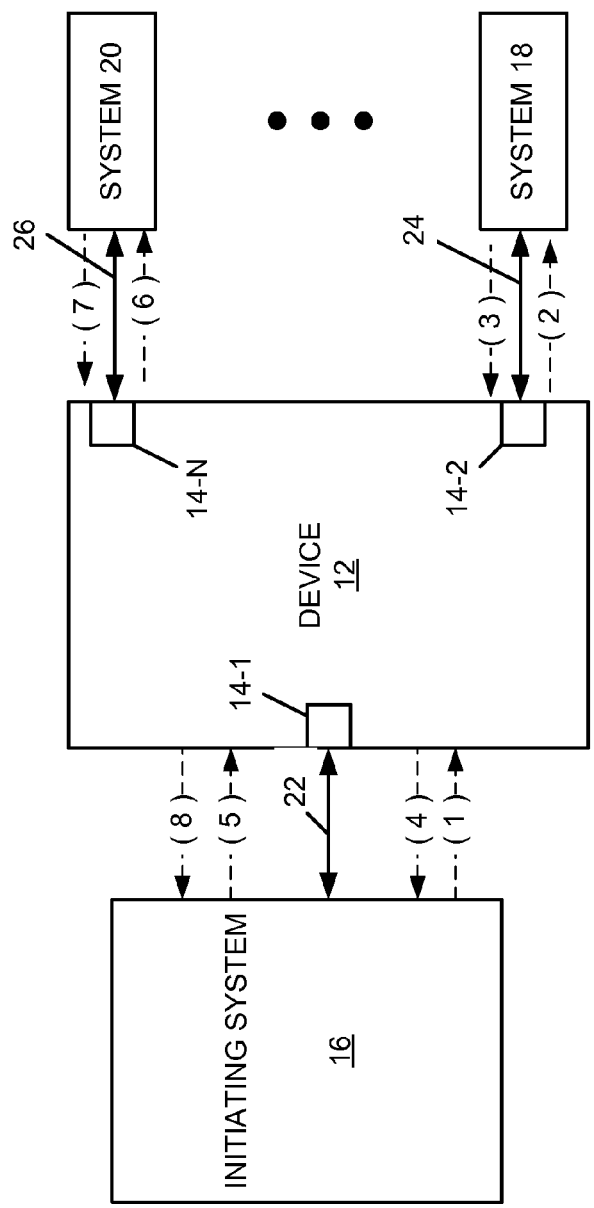
FIG. 1 is an embodiment of a data center environment engaged in traditional sequential frame forwarding behavior.
Figure 2:
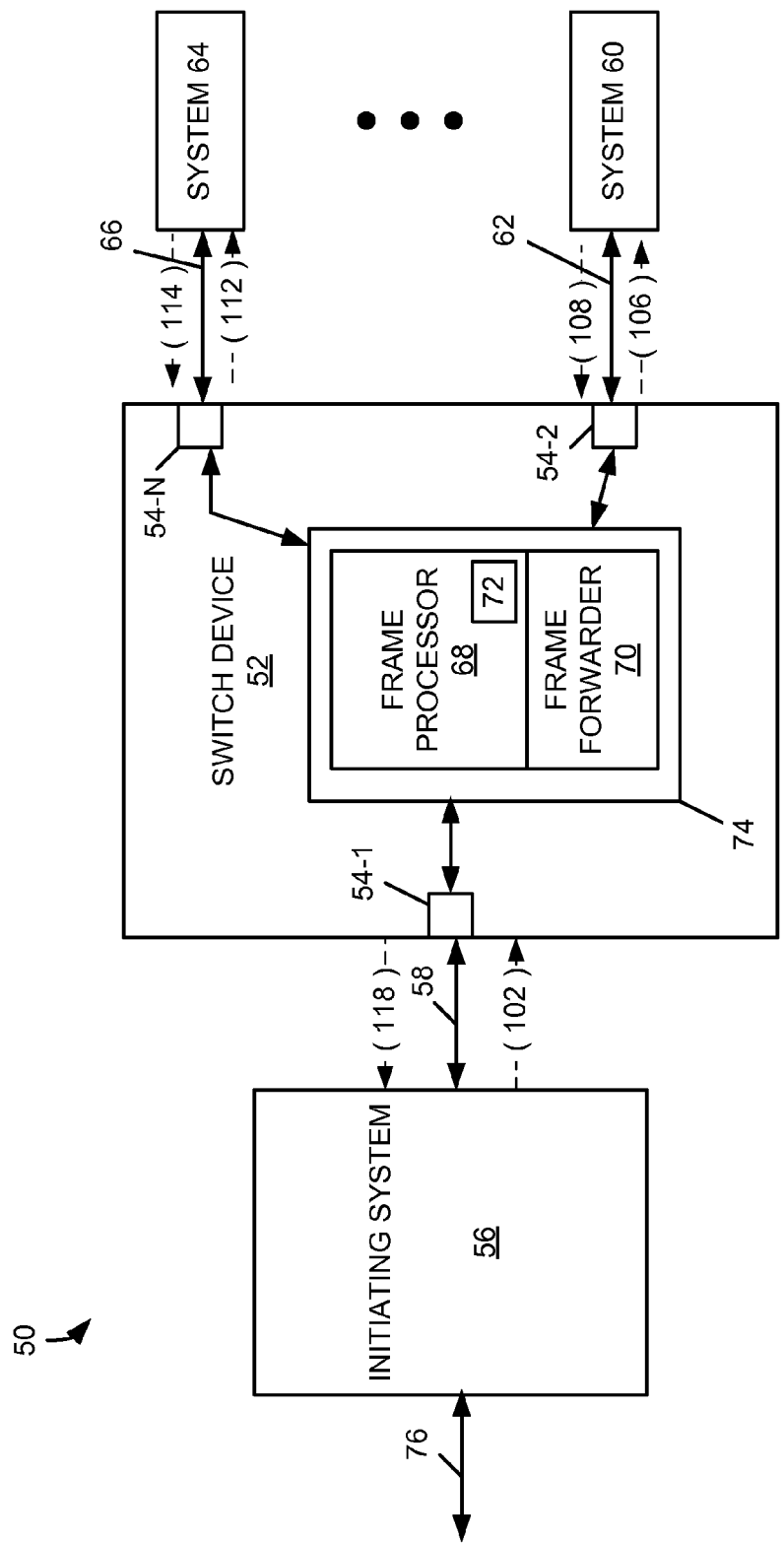
FIG. 2 is a functional block diagram representation of an embodiment of a data center environment engaged in sequential frame forwarding behavior of the present invention.

FIG. 2 shows an embodiment of a data center environment 50 constructed in accordance with the principles of the invention. The data center environment 50 includes a switch device 52 physically connected through port 54-1 to an initiating system 56 over physical link 58, physically connected through port 54-2 to a first computing system 60 over physical link 62, and physically connected through port 54-N to a second computing system 64 over physical link 66. The initiating system 56, switch device 52, first and second computing systems 60, 64 can be housed within a single chassis or electronics enclosure.

The switch device 52 includes a frame processor 68, a frame forwarder 70, and the ports 54-1, 54-2, 54-N (generally, 54). The switch device 52 can have more than the number of ports shown. The frame processor 68 includes logic 72 for executing the sequential frame forwarding process, as described herein. The logic 72, which in one embodiment includes one or more filters, may be implemented as hardware, software, or a combination of hardware and software.

As used herein, a filter is logic that examines specific content in the header of a frame and redirects that frame to a particular port of the switch device 52 based on the header content. The frame forwarder 70 prepares and transmits a frame through a port identified by the logic 72 of the frame processor 68. The frame processor 68, logic 72, a frame forwarder 70 of the switch device 52 can be implemented as an ASIC (Application Specific Integrated Circuit) component or chip set 74. In one embodiment, the switch device is an Ethernet switch module (e.g., 10 GB, 1 GB, 1/10 GB).

The initiating system 56 is connected to a network (not shown), examples of which include, but are not limited to, the Internet, LAN, WAN (wide area network), and MAN (metropolitan area network). Embodiments of the initiating system 56 include, but are not limited to, an appliance, a switching device, a router, a host, a server, and a special purpose computing system (with or without networking processors). Although only one initiating system 56 is shown, in the data center environment, there may be more than one. In general, the initiating system 56 receives frames from over the network (e.g., over link 76) and submits such frames through the switch device 52 to the computing systems 60, 64 for processing. From the perspective of the data center 50, frames arriving at the switch device 52 from the initiating system 56 are herein said to originate from the initiating system 56, although the actual origin of such frames may reside somewhere else on the network.

Each of the computing systems 60, 64 can be one of a variety of devices or systems including, but not limited to, an application server, a firewall, a database server, an intrusion protection system, an encryption system, a decryption system, a content switch, a file server, and a web server. Although only two are shown, the data center environment 50 can have more than the two computing systems 60, 64.

In one embodiment of the invention, the initiating system 56 maintains the policies that govern how incoming frames are to be sequentially processed by the various computing systems. For example, one such policy can be that an incoming frame be examined by a firewall (i.e., a first computing system) and afterwards by an intrusion protection system (i.e., a second computing system). In another embodiment of the present invention, the policies that govern the sequential handling of frames are embodied by the behavior of the filters executed by the switch device 52.

Figure 3:
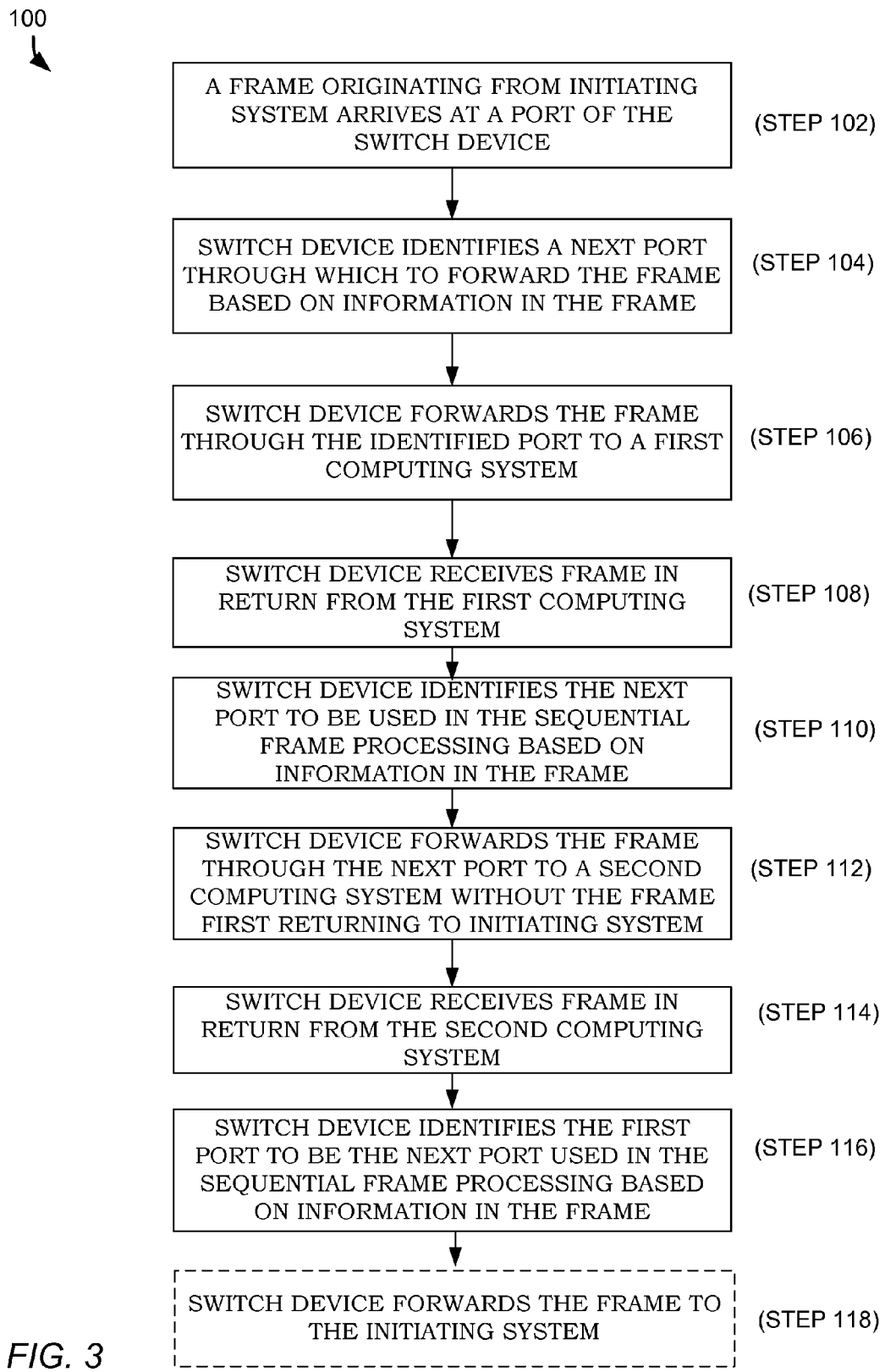
FIG. 3 is a flow diagram of an embodiment of process for performing sequential frame forwarding in accordance with the invention.

FIG. 3 shows an embodiment of a process 100 for performing sequential frame forwarding of the present invention. In the description of the process 100, reference is also made to the data center environment 50 of FIG. 2. At step 102, a frame originating from the initiating system 56 arrives at the port 54-1 of the switch device 52. The frame, also referred to as a packet or a protocol data unit (PDU), includes various fields. As examples, the frame can have a source and destination IP (internet protocol) addresses, source and destination MAC addresses a VLAN identifier, a VLAN tag, or combinations thereof. Consider, for purposes of illustrating the invention, that the frame is to be sequentially processed by the two other computing systems 60, 64 in the data center, and that the sequential order is first the computing system 60, followed by computing system 64.

At step 104, the frame processor 68, under the direction of the logic 72, identifies a port through which to forward the frame. One of a variety of mechanisms can be used to identify this port, examples of which are described in more detail below. In general, the port identification is based on information carried within the frame. The frame forwarder 70 forwards (step 106) the frame through the port 54-2 over the link 62 to the computing system 60. After the computing system 60 completes processing or viewing the frame, the computing system 60 returns (step 108) the frame to the switch device 52 over the link 62.

After the frame arrives at the port 54-2, the frame processor 68 of the switch device 52 identifies (step 110) the next port to be used in the sequential frame processing. The frame forwarder 70 (step 112) sends the frame through the identified port (in this example, to computing system 64 over link 66. After the computing system 64 completes its processing of the frame, the computing system 64 returns (step 114) the frame to the switch device 52 over the link 66. From certain information in the frame, the frame processor 68 identifies (step 116) the next port in the sequential frame processing. In this example, the next port leads to the initiating system 56; accordingly, the frame forwarder 68 forwards (step 118) the frame over the link 58 to the initiating system 56. In some transactions, the frame does not need to be eventually returned to the initiating system.

Forwarding Sequence—Port Identification

Figure 4:
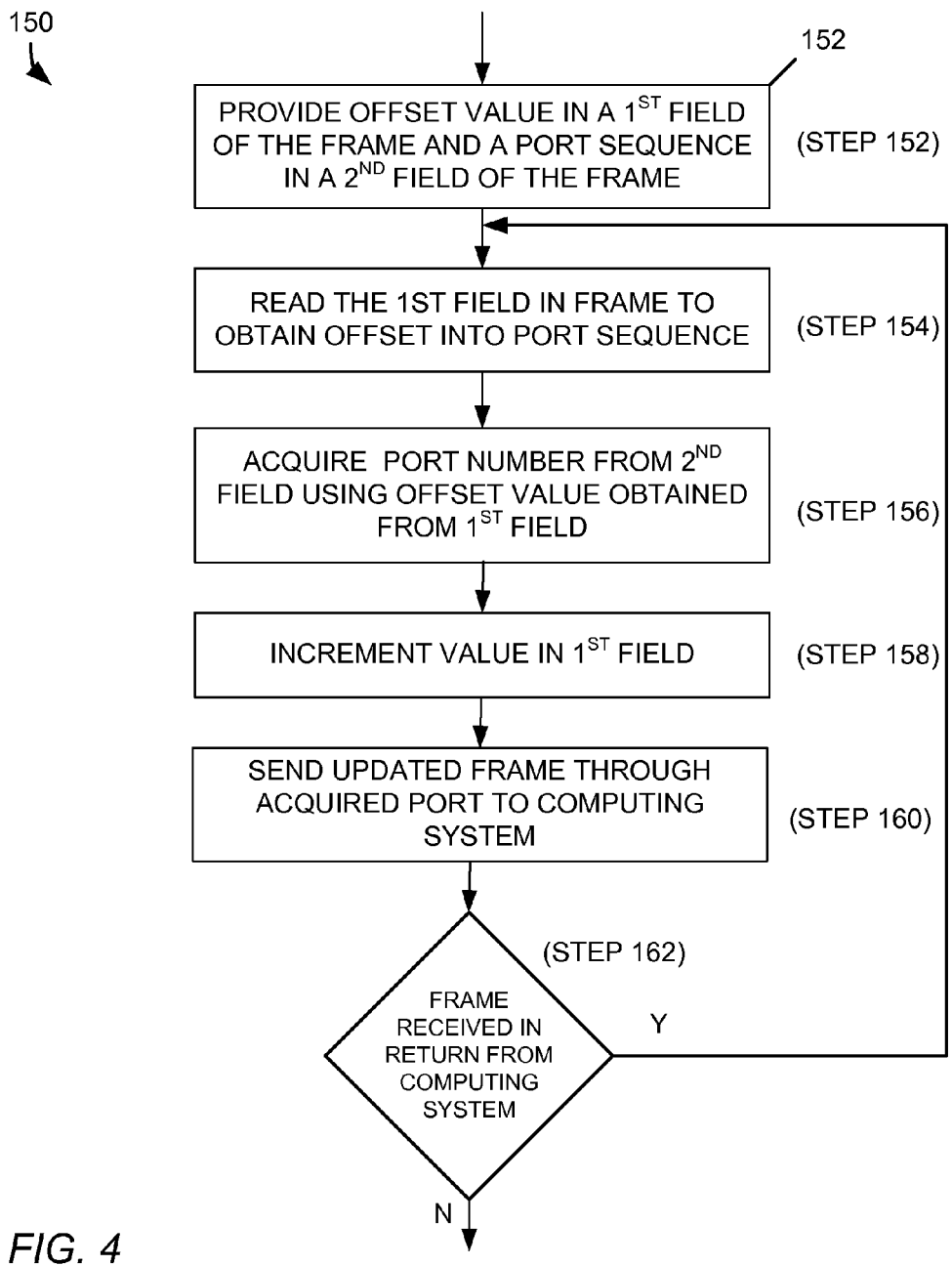
FIG. 4 is a flow diagram of an embodiment of process for identifying ports through which to forward frames during the sequential frame forwarding process of FIG. 3.

FIG. 4 shows an embodiment of a process 150 for identifying the next port to which to forward a frame. In the description of the process 150, reference is also made to FIG. 5A, FIG. 5B, and FIG. 5C, which together show an example of a progression of certain frame contents as the frame moves among the switch device and computing systems. At step 154, the initiating system 56 uses a first field of the frame to hold an offset value and a second field of the frame to hold a forwarding sequence. The forwarding sequence corresponds to the order in which other computing systems 60, 64 of the data center are to sequentially process the frame. The forwarding sequence stored in the second field is a sequence of port numbers. To be able to specify an appropriate forwarding sequence (i.e., port number sequence) for processing a given frame, the initiating system 56 knows, a priori, the port connections between the computing systems of the data center and the particular ports 54 of the switch device. The offset value stored in the first field functions as an offset (i.e., index or pointer) into the second field. In general, the offset value corresponds to the number of times the switch device receives the frame. The switch device uses this number as an offset into the second field from which to extract a port number.

In one embodiment, the frame is an IEEE 802.1q Ethernet frame having a six-byte source MAC address field, a six-byte destination MAC address field, and a VLAN ID field. Either the source MAC address field or the destination MAC address field can be used to store the forwarding sequence, and the VLAN ID field can be used to store the offset value. If the VLAN ID is unavailable for use in storing the offset value (for example, VLANs are deployed in the data center), an external VLAN tag (i.e., Q-in-Q) can be added to the frame to serve as the holder of the offset value. All computing systems 60, 64 connected to the switch device 52 are configured not to alter the contents of the VLAN ID field (or external VLAN tag) holding the offset value or the MAC address field holding the forwarding sequence. Although described herein with reference to Ethernet frame formats, the principles of the invention extend to other types of frame formats (e.g., Fibre Channel).

Figure 5A:
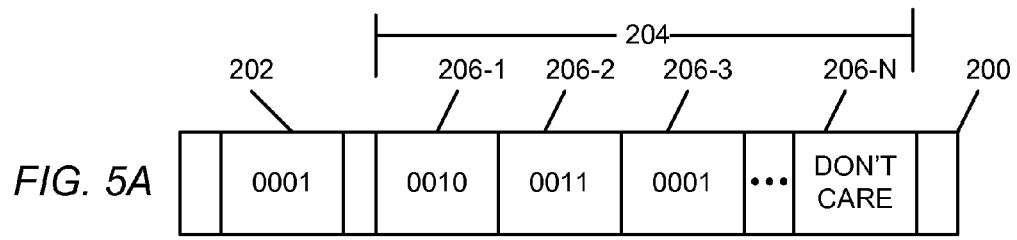
FIG. 5A, FIG. 5B, and FIG. 5C illustrate the content of certain fields of a frame as the frame moves among the switch device and computing systems of the data center environment.

When the frame arrives from the initiating system, the switch device extracts (step 154) the offset value stored in the first field and acquires (step 156) the next (i.e., egress) port from the second field. FIG. 5A shows an example embodiment of a frame 200 having a first field 202 and a second field 204. The location of the first field 202 relative to the second field 204 within the frame 200 as shown is merely for illustration purposes; the actual location of such fields depends on the particular frame format and on the fields being used to hold the forward sequence and offset value. The second field 204 includes a plurality of nibbles 206-1, 206-2, 206-3, 206-N (generally, 206). Each nibble 206 stores a port number. The order of the nibbles 206 defines the forwarding sequence (i.e., the sequence of port numbers). Here the forwarding sequence is port number 2, followed by port number 3, followed by port number 1 (i.e., "0010" in nibble 206-1, "0011" in nibble 206-2, and "0001" in nibble 206-3). Using the offset value and forwarding sequence of FIG. 5A as an illustrative example, the switch device 52 extracts port number 2 from the first nibble 206-1, because the offset value is 1. Although nibbles are described herein for holding port numbers, fewer or more bits than 4 bits can be used to represent a port number.

In an alternative embodiment, the switch device 52 can be configured to extract, by default, the port number from the first nibble 206-1 of the second field 204 for any frames arriving from the initiating system through the port 54-1. For such an embodiment, the initiating system 56 does not need to store the offset value in the field 204 of the frame.

Figure 5B:
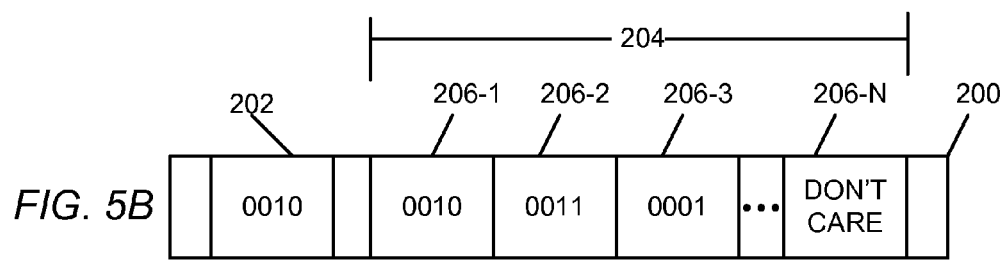

Before the switch device 52 forwards the frame to the port corresponding to the port number extracted from the first nibble 206-1 of the field 204, the switch device 52 increments (step 158) the offset value in the field 202. The forwarding sequence stored in the second field remains unchanged. FIG. 5B shows the offset value in field 202 as equal to 2. Then the switch device 52 sends (step 160) the frame to the second computing system 60, which has a physical link 62 to port 2 (for the purposes of this example, port number 1 corresponds to port 54-1, port number 2 corresponds to port 54-2, and port number 3 corresponds to port number 54-N).

Figure 5C:
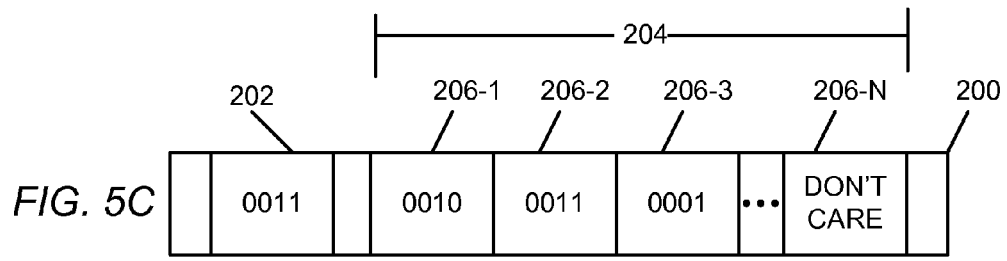

If, at step 162, the frame returns from the computing system, which is what occurs in this example, the switch device 52 again extracts (step 154) the offset value stored in the first field 202 and acquires (step 156) the next port from the second field 204. Now, the current offset value in the field 202 is equal to 2, directing the switch device 52 to extract the port number from the second nibble 206-2 of the field 204. The extracted port number is equal to 3. After incrementing the offset value (step 158), as shown in FIG. 5C, the switch device 52 sends (step 160) the frame to the computing system 64 physically linked to port number 3 (i.e., port 54-N).

If the frame returns from the computing system (step 162), the switch device 52 extracts the port number from the third nibble 206-3 because the offset value is now equal to 3. The port number in the third nibble 206-3 is equal to 1, which causes the switch device 52 to forward the frame through port number 1 (i.e., port 54-1). The initiating system 56 is physically linked to port number 1, and consequently receives the frame from the switch device. Thus, multiple computing systems have sequentially handled (processed) the frame before the frame returns to the initiating system. As noted previously, the frame need not eventually return to the initiating system.

Figure 6:
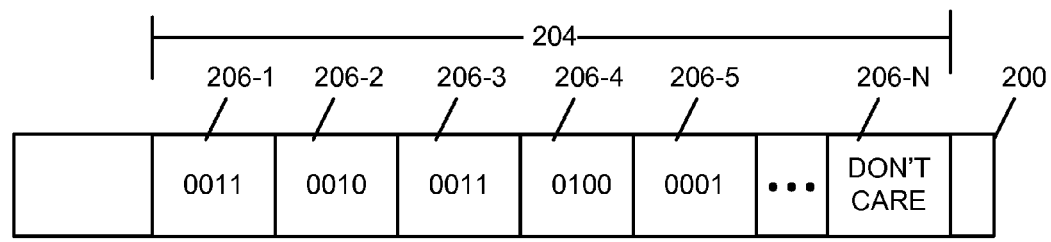
FIG. 6 is a diagram of a field within a frame containing an example of a port number sequence.

The length of a forwarding sequence can vary, depending upon the number of other computing systems that are to participate in the sequential processing of the frame and the number of times each of such other computing systems appears in that forwarding sequence. For example, FIG. 6 shows another example of a forwarding sequence as stored, for example, in a source MAC address field. This forwarding sequence causes the switch device to send the frame out sequentially through port number 3, port number 2, port number 3 again, and port number 4 (provided the computing systems connected to such ports return the frame to the switch device) before returning the frame to the initiating system through port number 1. The use of port number 1 for connecting to the initiating system is arbitrary; the initiating system can be connected to any of the ports of the switch device in the practice of the invention.

Figure 7:
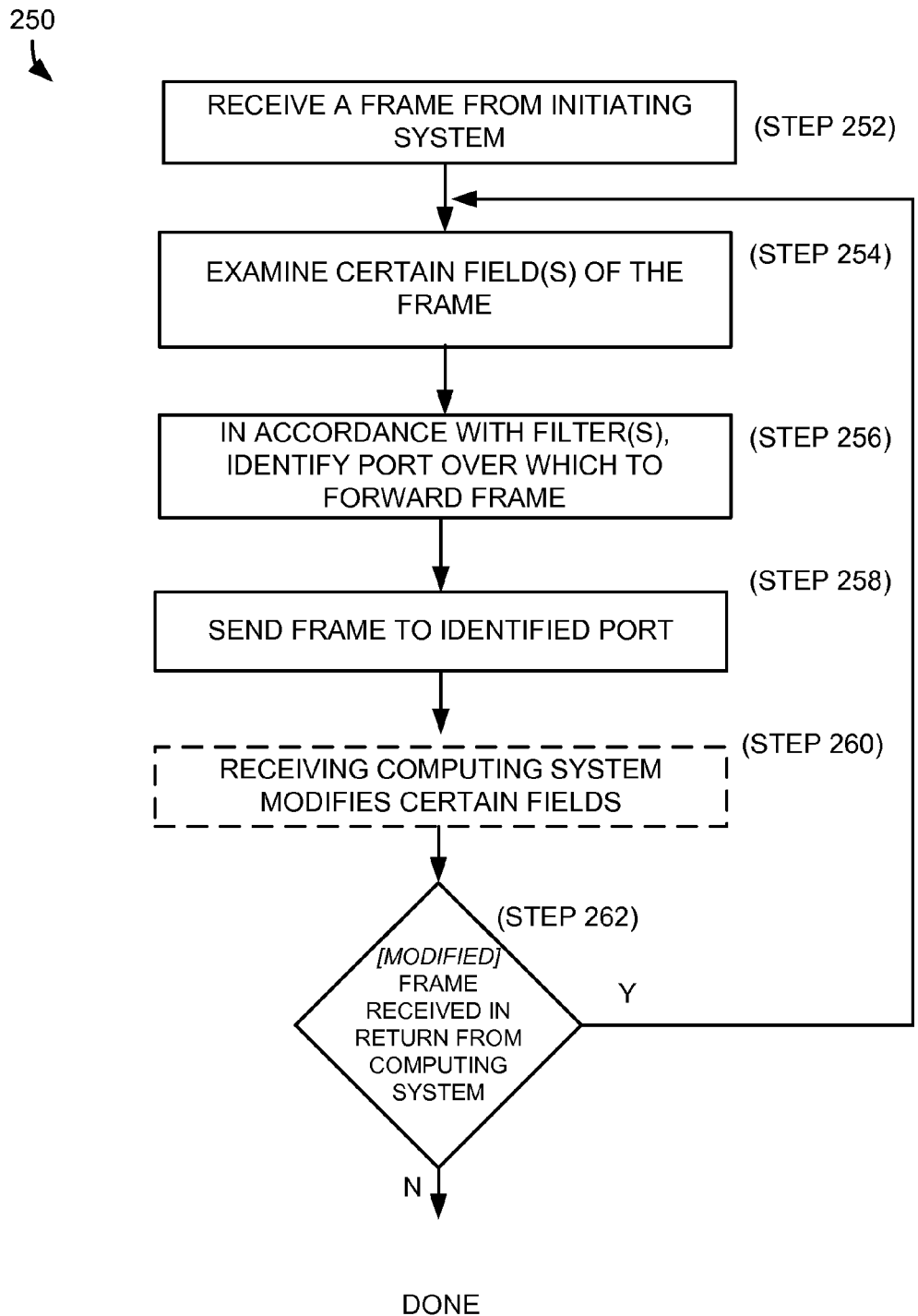
FIG. 7 is a flow diagram of another embodiment of process for identifying ports through which to forward frames during the sequential frame forwarding process of FIG. 3.

FIG. 7 shows an embodiment of another process 250 for identifying the next port to which to forward a frame. In this embodiment, the initiating system 56 does not need to include a forwarding sequence within the frame. Instead, the switch device uses various filters to identify the port sequence based on information carried by the frame, as described below. In addition, in this embodiment the frame does not need to carry an offset value, although the use of a count to track the number of times the frame enters the switch device may in some embodiments be used, in conjunction with the filters, to identify the next port in the port sequence. Many different filters can be designed to identify a next port in a forwarding sequence.

As an illustrative example, a frame arrives (step 252) at the switch device 52 from the initiating system 56. The switch device 52 extracts (step 254) information from one or more specific fields of the frame header. For example, the specific fields can be a source IP address field and a destination IP address field. A particular filter running on the switch device correlates (step 256) the information acquired from these fields to a particular egress port. As a simple example, the switch device can use either or both IP addresses as an offset into a look-up table that correlates IP addresses to ports. As another example, the identity of the ingress port can be used in combination with one or both IP addresses when searching the look-up table. Yet another example, the filter can perform a hash on these IP addresses to derive a hash value, and then accesses a hash table that supplies the identity of the egress port based on the hash value. These examples are not exhaustive, there being no known limit to the number and types of filters that can be designed for identifying the next port in a forwarding sequence based on an incoming frame.

After identifying the egress port, the switch device redirects (step 258) the frame to the computing system connected to that port. The computing system that receives the frame can modify (step 260) the addresses within the source and destination IP address fields before returning the frame to the switch device. If the switch device receives the frame (step 262), modified or unchanged, the switch device repeats the process of extracting information from certain fields of the frame (which may or may not be different from the fields examined when the frame arrived originally from the initiating system), running a filter to identify the next port, and redirecting the frame to the computing system connected to that port. Eventually, the frame may be returned to the initiating system, depending upon the operation of the filters.

Embodiments of the described invention may be implemented in hardware (digital or analog), software (program code), or combinations thereof. Program code implementations of the present invention may be embodied as computer-executable instructions on or in one or more articles of manufacture, or in or on computer-readable medium. A computer, computing system, or computer system, as used herein, is any programmable machine or device that inputs, processes, and outputs instructions, commands, or data. In general, any standard or proprietary, programming or interpretive language can be used to produce the computer-executable instructions. Examples of such languages include C, C++, Pascal, JAVA, BASIC, Visual Basic, and C#.

Examples of articles of manufacture and computer-readable medium in which the computer-executable instructions may be embodied include, but are not limited to, a floppy disk, a hard-disk drive, a CD-ROM, a DVD-ROM, a flash memory card, a USB flash drive, an non-volatile RAM (NVRAM or NOVRAM), a FLASH PROM, an EEPROM, an EPROM, a PROM, a RAM, a ROM, a magnetic tape, or any combination thereof. The computer-executable instructions may be stored as, e.g., source code, object code, interpretive code, executable code, or combinations thereof.

While the invention has been shown and described with reference to specific preferred embodiments, it should be understood by those skilled in the art that various changes in form and detail may be made therein without departing from the spirit and scope of the invention as defined by the following claims.

What is claimed is:

1. A method of sequentially processing a frame in a data center, the method comprising:
    receiving at an ingress port of a switch device a frame originating from an initiating system and requiring sequential processing by a first computing system and a second computing system of the data center;
    identifying by the switch device, in response to information carried in the frame, a first of a plurality of egress ports of the switch device and exclusively passing the frame to the first of the plurality of egress ports;
    exclusively forwarding the frame, by the switch device, from the first egress port to the first computing system:
    receiving the frame at the switch device in return from the first computing system after the first computing system completes processing the frame;
    identifying, by the switch device, in response to information carried in the frame received in return from the first computing system, a second egress port of the plurality of egress ports of the switch device and exclusively passing the frame to the second egress port; and
    exclusively forwarding the frame, by the switch device, to the second computer system from the second egress port for processing by the second computing system before the frame is returned through the switch device to the initiating system.

2. The method of claim 1, further comprising:
    extracting a value from a first field of the frame;
    extracting from a second field of the frame an identity of one of the plurality of egress ports through which to forward the frame by using the extracted value as a pointer to a bit location in the second field.

3. The method of claim 2, further comprising: incrementing the value in the first field of the frame before forwarding the frame to the identified one egress port.

4. The method of claim 2, further comprising encoding in the second field a forwarding sequence of port numbers to be used to accomplish sequential processing of the frame.

5. The method of claim 2, wherein the second field is a MAC address of the frame.

6. The method of claim 5, wherein the first field is a VLAN ID of the frame.

7. The method of claim 5, wherein the first field is an external VLAN tag added to the frame.

8. The method of claim 1, further comprising:
    extracting information from one or more fields of a header of the frame;
    identifying one of the plurality of egress ports through which to forward the frame based on the information obtained from the one or more fields of the header of the frame.

9. A data center, comprising:
    an initiating system;
    first and second computing systems; and
    a switch device physically linked to the initiating system through an ingress port, to the first computing system through a first egress port, and to the second computing system through a second egress port, the switch device being adapted to (a) receive at the ingress port a frame requiring processing sequentially by the first computing system and the second computing system, (b) identify, in response to information carried in the frame, the first of a plurality of egress ports at which to exclusively pass the frame for forwarding to the first computing system, (c) exclusively forward the frame from the first egress port to the first computing system; (d) receive the frame at the switch device in return from the first computing system after the first computing system completes processing of the frame, (e) identify, in response to information carried in the frame received in return from the first computing system, the second of the plurality of egress ports at which to exclusively pass the frame for forwarding to the second computing system, and (f) exclusively forward the frame through the second egress port to the second computing system for processing by the second computing system before the frame is returned through the switch device to the initiating system.

10. The data center of claim 9, wherein the switch device further comprises:
logic for extracting a value from a first field of the frame; and
logic for extracting from a second field of the frame an identity of one of the plurality of egress ports through which to forward the frame by using the extracted value as a pointer to a bit location in the second field.

11. The data center of claim 10, wherein the switch device further comprises logic for incrementing the value in the first field of the frame before forwarding the frame to the identified one of the plurality of egress ports.

12. The data center of claim 10, wherein the initiating system includes logic for encoding in the second field a forwarding sequence of port numbers to be used to accomplish sequential processing of the frame.

13. The data center of claim 10, wherein the second field is a MAC address of the frame.

14. The data center of claim 10, wherein the first field is a VLAN ID of the frame.

15. The data center of claim 10, wherein the first field is an external VLAN tag added to the frame.

16. The data center of claim 10, wherein the switch device further comprises:
logic for extracting information from one or more fields of the frame;
a filter for identifying the one of the plurality of egress ports through which to forward the frame based on the information obtained from the one or more fields of the frame.

17. A switch device, comprising:
a plurality of ports including an ingress port physically linked to an initiating system, a first of a plurality of egress ports physically linked to a first computing system, and a second of a plurality of egress ports physically linked to a second computing system;
a frame processor receiving at the ingress port a frame originating from the initiating system and requiring processing sequentially by the first computing system and the second computing system, the frame processor including logic for identifying, in response to information carried in the frame, the first of the plurality of egress ports through which to exclusively pass the frame prior to forwarding the frame to the first computing system;
a frame forwarder exclusively forwarding the frame through the first egress port to the first computing system for processing by the first computing system;
wherein the frame processor includes logic for receiving the frame in return from the first computing system after the first computing system completes processing of the frame and for identifying, in response to information carried in the frame received in return from the first computing system, the second of the plurality of egress ports through which to exclusively pass the frame prior to forwarding the frame to the second computing system for processing, and wherein the frame forwarder is adapted to exclusively forward the frame through the second egress port to the second computing system for processing by the second computing system before the frame is returned through the switch device to the initiating system.

18. The switch device of claim 17, further comprising:
logic for extracting a value from a first field of the frame; and
logic for extracting from a second field of the frame an identity of one of the plurality of egress ports through which to forward the frame by using the extracted value as a pointer to a bit location in the second field.

19. The switch device of claim 18, further comprising logic for incrementing the value in the first field of the frame before forwarding the frame to the identified one of the plurality of egress ports.

20. The switch device of claim 18, wherein the second field is a MAC address of the frame.

21. The switch device of claim 18, wherein the first field is a VLAN ID of the frame.

22. The switch device of claim 18, wherein the first field is an external VLAN tag added to the frame.

23. The switch device of claim 17, further comprising:
logic for extracting information from one or more fields of the frame;
a filter for identifying one of the plurality of egress ports through which to forward the frame based on the information obtained from the one or more fields of the frame.

24. A method of processing a frame in a data center, the method comprising:
receiving a frame at a switch originating from an initiating system;
determining, by the switch from information in the frame, a first of a plurality of egress ports of the switch through which to exclusively provide the frame for forwarding;
exclusively forwarding, by the switch, the frame from the first of the plurality of egress ports to a first server of a plurality of servers;
modifying, by the first server, information in the frame to affect frame-forwarding logic of the switch;
receiving, by the switch, the modified frame from the first server; and
exclusively providing the frame received from the first server to a second of the plurality of egress ports, then exclusively forwarding the frame from the second of the plurality of egress ports to a second server of the plurality of servers in response to the information in the frame modified by the first server before the frame is returned through the switch device to the initiating system.

25. The method of claim 24, wherein the step of determining includes:
extracting information from one or more fields of the frame;
using the extracted information to determine a pointer to a location in switch memory; and determining the second of the plurality of egress ports through which to forward the frame from information at the location in the switch memory.

26. The method of claim 25, wherein the switch memory includes a table that correlates hash values to port identities, and wherein the step of using the extracted information to determine a pointer to a location in switch memory includes:
performing a hash on the extracted information to derive a hash value;
accessing an entry in the table using the hash value as an index to the table; and
identifying the second of the plurality of egress ports from the accessed entry.

27. The method of claim 25, wherein the extracted information includes an IP address and the switch memory includes a table that correlates IP addresses to port identities, and wherein the step of using the extracted information to determine a pointer to a location in switch memory includes:
accessing an entry in the table using the IP address extracted from the frame as an offset into the table; and
identifying the second of the plurality of egress ports from the accessed entry.

28. The method of claim 24, wherein the step of modifying, by the given server, information in the frame includes modifying information in an address field of the frame before transmitting the modified frame back to the switch.

29. An electronics enclosure, comprising:
a plurality of servers; and
a switch physically linked to each server of the plurality of servers through a different port of a plurality of ports, the switch determining to exclusively pass a frame received from an initiating system to a first port of the plurality of ports then exclusively forwarding the received frame to a first server of the plurality of servers through the first port of the plurality of ports based on information in the received frame, wherein the first server modifies information in the frame to affect frame-forwarding logic of the switch, the switch receiving the modified frame through the first port of the plurality of ports from the first server then exclusively passing the frame received from the first server to a second server through a second port of the plurality of ports of the switch in response to the information in the frame modified by the first server before the frame is returned through the switch to the initiating system.

30. The electronics enclosure of claim 29, wherein the switch determines the first port of the plurality of ports through which to forward the frame by extracting information from one or more fields of the frame, using the extracted information to determine a pointer to a location in switch memory, and determining the second port of the plurality of ports through which to forward the frame from information at the location in the switch memory.

31. The electronics enclosure of claim 30, wherein the switch memory includes a table that correlates hash values to port identities, and wherein the switch determines a pointer to a location in switch memory by performing a hash on the extracted information to derive a hash value, accessing an entry in the table using the hash value as an index to the table, and identifying the second port of the plurality of ports from the accessed entry.

32. The electronics enclosure of claim 30, wherein the extracted information includes an IP address and the switch memory includes a table that correlates IP addresses to port identities, and wherein the switch determines the pointer to the location in switch memory by accessing an entry in the table using the IP address extracted from the frame as an offset into the table, and identifying the second port of the plurality of ports from the accessed entry.

33. The electronics enclosure of claim 29, wherein the given server modifies information in an address field of the frame before transmitting the modified frame back to the switch.

34. A chipset comprised of one or more integrated circuits, comprising:
memory storing a table with entries, each entry correlating a value to a port identity;
a frame forwarder with logic configured to switch frames to ports of a switch device;
a frame processor with logic configured to derive a value from content in a header of a frame received through the switch device from an initiating system, to access one of the entries of the table using the value as an index to the table, and to identify a first port of the switch device from the accessed entry, and wherein the frame forwarder exclusively forwards the received frame to a first computing system through the first port, the frame processor receiving the frame back through the switch device modified by the first computing system, then the frame forwarder exclusively forwarding the modified frame to a second computing system through a second port of the switch device before the frame is returned through the switch device to the initiating system.

* * * * *